United States Patent Office 3,676,156
Patented July 11, 1972

3,676,156
FLAVOR ENHANCING MATERIALS AND METHOD OF PREPARING SAME
Alan P. Bentz, Stamford, Conn., and Richard Scarpellino, Ramsey, N.J., assignors to General Foods Corporation, White Plains, N.Y.
No Drawing. Filed May 20, 1970, Ser. No. 39,853
Int. Cl. A23l 1/26
U.S. Cl. 99—140 R            11 Claims

ABSTRACT OF THE DISCLOSURE

Flavor enhancing materials are prepared by reacting ammonia with carbonyl compounds in an aqueous medium. The flavor enhancing materials are stable in the aqueous medium and retain their high potency and quality when combined with an edible fixation agent and are dehydrated.

BACKGROUND OF THE INVENTION

Field of the invention

This invention relates, in general, to flavor enhancing materials and a method of preparing the same. In particular, the invention is directed toward those compounds which enhance the flavor of coffee, tea, and other beverages, and are the products of chemical reactions between ammonia and certain carbonyl compounds when the reations take place in aqueous media.

Description of the prior art

Chemical reactions of aliphatic aldehydes and ammonia have been studied for the purpose of determining the formation of "aldehyde-ammonias" ($\alpha$-amino alcohols) which are generally unstable—either reverting to starting materials or polymerizing. The forwad reaction is acid catalyzed. Other reactions of carbonyls with ammonia yield various heterocycles and polymers of use in commerce. However, these are generally carried out at elevated temperatures, in the presence of various catalysts, and in non-aqueous solvents (or no solvent, i.e., vapor phase). Within present knowledge, the process of reacting ammonia with low molecular weight carbonyl compounds in an aqueous medium to obtain food flavor enhancing material has completely escaped the prior art.

SUMMARY OF THE INVENTION

In view of the prior art, it has been surprisingly discovered that chemical reactions in an aqueous medium between ammonia and several low molecular weight carbonyl compounds will, under certain conditions, produce excellent flavor enhancing materials—especially suitable for coffee and tea. Furthermore, the flavoring materails resulting from the chemical reactions according to this invention are stable in the aqueous medium over prolonged periods of time and also retain their original high potency and quality when combined with a fixative agent, such as gum arabic, and are then freeze-dried.

The present invention is predicated on the discovery that satisfactory coffee and tea flavoring materials are obtained only when the carbonyl/ammonia reaction takes place in an aqueous solution. The very essence of the invention resides in the unexpected finding that the carbonyl/ammonia reactions occur in the presence of water to yield the desirable reaction products. Although the reaction products occur at molar ratios of ammonia to carbonyl as high as 40:1 or higher, the most favorable results occur when the molar ratio of ammonia to carbonyl compound at the start of the reaction ranges from about 10:1 to about 5:1. Under these conditions, it is possible, by using any one or a combination, of a few carbonyl compounds as a reactant with ammonia, to produce a variety of satisfactory stable food flavoring enhancing materials of high quality.

It will thus be appreciated that the products of this invention provide for stable flavor enhancing materials for use in foods.

It is still another object of this invention to provide stable food flavoring adjuvants in dry powder form.

It is still another object of this invention to provide food flavoring adjuvants which find excellent utility in coffee, tea, and other beverages.

These and other objects, features, and advantages of the present invention will hereinafter appear and, for the purpose of illustration but not limitation, exemplary embodiments of the present invention are hereinafter described in detail.

DESCRIPTION OF THE PREFERRED EMBODIMENTS

In accordance with the present invention, it has been found that an aqueous solution of ammonia (about 0.04 to about 0.08 N) when added and mixed with an approximate equal volume of aqueous solution of a selected carbonyl compound, or combination of carbonyl compounds wherein the concentration of carbonyl compound or compounds, ranges from about 0.05 to about 0.30 weight percent (after the ammonia addition) will yield, upon moderate agitation followed by standing at room temperature, a dilute solution of flavoring material having a decided "woody" or "nutty" flavor note. The flavoring material so produced is stable over prolonged periods of time.

Several carbonyl compounds undergoing the reaction with ammonia yield satisfactory food flavoring adjuvant materials having similar flavor notes organoleptically identified and defined as "woody," "cedar-like," "hay-like," or "nutty." The following table lists the flavor notes yielded by the reactions of representative carbonyl compounds with ammonia according to the method of this invention.

TABLE I

| Carbonyl compound: | Flavor note |
|---|---|
| Diacetyl | Nutty. |
| 2,3-pentanedione | Woody/cedar-like. |
| Pyruvaldehyde | Woody/hay-like. |
| 2,3-hexanedione | Woody/hay-like. |

The reaction of each of the carbonyl compounds with ammonia appears to take place immediately and, although the time period varies for each reaction to reach substantially completion, in practically all instances the reaction between the carbonyl compound and ammonia is completed after the dilute aqueous mixture is gently agitated and then permitted to stand for a period ranging from about 4 to 18 hours at 20–25° C.

Chromatographic analyses show each of the carbonyl reactants to produce a multiplicity of reaction products. Although work is continuing in order to chromatographically separate and identify each of the many reaction compounds for purposes of this invention, it has been found that no fractionation of the products of the reactions is necessary for the ultimate production of the highly desirable coffee and tea flavoring materials.

The dilute solution of flavoring materials of each of the reactions, identified in Table I can be employed to enhance the flavor of coffee or tea extracts. Generally, these reaction mixtures singly, or in combination, improve the flavor of coffee and tea beverages and also improve chocolate beverages. Preferably, after the dilute flavor material solution is allowed to stand for a period up about 18 hours at room temperature conditions, gum arabic or other conventional fixative materials are added to the solution to the extent of about 10% by weight of the dilute solution and thoroughly mixed. The aqueous mixture of fixative material, residual unreacted compounds, and the flavor materials is then freeze-dried by any one of a number of well-known conventional techniques.

The freeze-dried solids are, for the most part, white powdery material of low density having the desirable potent flavorful notes as characterized in the representative list shown in Table I, and having excellent utility as flavor enhancers for coffee, tea, and chocolate beverages.

It is not to be inferred that all carbonyl compounds, when reacted with ammonia under the above-described conditions, will produce reaction products suitable for food flavor use. Among the more than fifteen carbonyl compounds employed in the inventive procedure, Table I lists the most promising. Other carbonyl compounds, while undergoing similar reactions, are less effective and still others produce either unsatisfactory reaction products or are non-reactive within the operative conditions of the invention. For purposes of this invention, it is contemplated that those carbonyl compounds which are operative and produce desirable food flavoring materials are restricted to water soluble aliphatic carbonyl compounds having 2–6 carbons. The unsaturated compounds may be alpha,beta-unsaturated carbonyls.

Surprisingly, in order for the reactants to succeed in producing the desirable flavoring materials, water, even in a limited amount, appears to be necessary to catalyze the reactions of each of the carbonyl compounds with ammonia. Satisfactory reaction products are produced when the concentration of carbonyl compound in aqueous solution ranges from about 0.05 percent to about 0.30 percent on a weight basis after the addition of ammonia, assuming the carbonyl is soluble in water to that extent. The added aqueous solution of ammonia entering into the reaction must be of sufficient quantity to supply a molar ratio of ammonia to carbonyl ranging from about 1:1 to about 40:1 and preferably about 5:1 to about 10:1. Larger quantities of ammonia superimpose pH effects with little effect on flavor.

As previously mentioned, the reaction proceeds immediately at room temperature (20–25° C.) conditions and completion is substantially attained after standing at these temperature conditions for about 4 hours to 18 hours. At a temperature of 50° C. the reactions of ammonia with most of the carbonyl compounds, appears to be complete within one hour.

The fixative agent may be any one of a number of gums and dextrins, and experience has shown the best results are obtained when the fixative is added to the dilute solution of flavor material products of the reaction to the extent of about 20 to about 35 percent based on the weight of the dilute solution. At this concentration, the mixture may be freeze-dried to provide the desired food flavoring material in dried powdered form.

The following examples illustrate the various facets of the invention. It should be understood, however, that these examples are merely meant to be illustrative and the invention is not to be limited thereto.

EXAMPLE I

Reaction product of diacetyl with ammonia (1) A quantity of 0.235 ml. of 28% aqueous ammonia was added to 100 ml. of water.
(2) To the above solution was then added 0.25 ml. of diacetyl.
(3) The solution of ammonia and diacetyl was mixed and then allowed to stand in a stoppered flask at room temperature for about 18 hours.

EXAMPLE II

Flavor enhanced soluble coffee beverage

After reacting for approximately 18 hours at room temperature, 0.1 ml. of the mixture of Example I was added to 200 ml. of soluble coffee beverage. The reaction product of Example I produced a desirable "nutty" flavor note when compared to the control.

EXAMPLE III

Freeze-dried reaction product of ammonia with diacetyl

A 20 ml. sample of the flavor mixture prepared as described in Example I was homogenized with 5 grams of gum arabic and freeze-dried. The dried product exhibited little odor. A sample of the freeze-dried product, when dissolved in hot water, produced a "nutty" aromatic flavor and as the water cooled, the aroma and flavor became more pronounced in "musty" character.

EXAMPLE IV

Reaction product of 2,3-pentanedione with ammonia (1) An aqueous ammonia solution was prepared containing 5 ml. of concentrated $NH_3$ per liter.
(2) To 0.2 ml. of 2,3-pentanedione was added the above ammonia solution and made up to 100 ml.
(3) The 2,3-pentanedione/$NH_3$ solution was mixed and then allowed to stand in a stoppered flask at room temperature for about 18 hours.

EXAMPLE V

Flavor enhanced soluble tea beverage

After reacting for approximately 18 hours at room temperature, 0.1 ml. of the mixture of Example IV was added to 200 ml. of soluble tea beverage. The reaction product of Example IV produced a desirable "woody" note when compared to the control.

EXAMPLE VI

Flavor enhanced synthetic chocolate beverage

The mixture of Example IV, after reacting for approximately 18 hours, was added to a synthetic chocolate flavored beverage at a level of 0.05 ml. to 200 ml. of beverage. When compared organoleptically, the beverage containing the 2,3-pentanedione/$NH_3$ was judged to be superior to the control by virtue of having the astringency characteristics of natural chocolate as well as additional desirable flavor notes.

EXAMPLE VII

Reaction of pyruvaldehyde with ammonia (1) An ammonia solution of 5 ml. of concentrated $NH_3$ in one liter of water was prepared.
(2) To 0.5 ml. of 40% pyruvaldehyde (aqueous) was added the above ammonia solution and made up to 100 ml.
(3) The pyruvaldehyde/$NH_3$ solution was mixed and then permitted to stand in a stoppered flask at room temperature for about 18 hours.

EXAMPLE VIII

Flavor enhanced soluble coffee beverage

A quantity of 0.045 ml. of the mixture from Example IV added to 0.1 ml. of the mixture from Example VII, when mixed with 200 ml. of soluble coffee beverage, produced a desirable flavor enhancing effect by augmenting the astringency and also improved the mouth-feel of the beverage.

This example illustrates the effect of combining the reaction products of the invention to produce synergistic flavor enhancing benefits.

EXAMPLE IX

Reaction product of diacetyl and pyruvaldehyde with ammonia (1) An aqueous ammonia solution was prepared as in Example IV.

(2) To 0.2 ml. of diacetyl and 0.5 ml. of 40% pyruvaldehyde solution was added sufficient ammonia solution (Step I above) to make 100 ml. of the mixture.

(3) The diacetyl/pyruvaldehyde/NH₃ mixture was mixed and then allowed to react over night (about 18 hours) at room temperature.

EXAMPLE X

Flavor enhanced soluble tea beverage (1) To one cup (200 ml.) of instant tea beverage (4.5 g. instant tea/1400 ml. H₂O) was added 0.05 ml. of the reaction mixture of Example IX. The resulting tea beverage had a desirable "woody" flavor note when compared with a control.

This example illustrates the invention in terms of reacting ammonia with two carbonyl compounds in aqueous medium to obtain a reaction product having flavor enhancing characteristics.

EXAMPLE XI

Reaction product of 2,3-hexanedione with ammonia (1) An aqueous ammonia solution was prepared as in Example IV.

(2) To 0.2 ml. of 2,3-hexanedione was added sufficient ammonia solution (Step 1 above) to make 100 ml. of the mixture.

(3) The 2,3-hexanedione/NH₃ mixture was thoroughly mixed and then allowed to react overnight (about 18 hours) at room temperature.

EXAMPLE XII

Flavor enhanced soluble tea beverage

To a cup (200 ml.) of instant tea beverage (2.4 g. instant tea/liter H₂O) was added 0.05 ml. (one drop) of the reaction mixture of Example XI. The resulting tea beverage had a desirable "woody/hay-like" flavor note not detectable in the control.

In view of the above, it will be seen that the several objects of the invention are achieved and other advantageous results obtained.

Upon consideration of the foregoing, it will become apparent to those skilled in the art that various modifications may be made without departing from the invention embodied herein. Therefore, only such limitations should be imposed as are indicated by the spirit and scope of the appended claims.

We claim:

1. A method of preparing a food flavoring enhancing material which consists of reacting ammonia with a water soluble aliphatic carbonyl compound selected from the group consisting of aliphatic aldehydes and aliphatic ketones whose shortest carbon chain contains two carbons and whose longest carbon chain contains not more than 6 carbon atoms and mixtures thereof, in an aqueous solution wherein the concentration of the carbonyl compound ranges from about 0.05 to about 0.30 weight percent and the mole ratio of ammonia to carbonyl compound initially present is from about 1:1 to about 40:1.

2. The method of claim 1 wherein the carbonyl compound is diacetyl.

3. The method of claim 1 wherein the carbonyl compound is 2,3-pentanedione.

4. The method of claim 1 wherein the carbonyl compound is pyruvaldehyde.

5. The method of claim 1 wherein the carbonyl compound is 2,3-hexanedione.

6. The method of claim 1 including the additional step of fixing the resulting flavor enhancing material with a water soluble edible fixative material and dehydrating the fixed flavor enhancing material.

7. The method of claim 6 wherein the fixed flavor enhancing material is dehydrated by freeze-drying.

8. The method of claim 6 wherein the water soluble edible fixative material is selected from the group consisting of dextrins and gums.

9. The flavor enhancing reaction product according to the method of claim 1.

10. Soluble coffee containing the flavor enhancing reaction product of claim 1.

11. Soluble tea containing the flavor enhancing reaction product of claim 1.

References Cited

Ogata et al., "Kinetics Of The Condensation Of Some Aliphatic Aldehydes With Ammonia," Tetrahedron, vol. 20, (1964), pp. 1573-8.

MORRIS O. WOLK, Primary Examiner

W. BOVEE, Assistant Examiner

U.S. Cl. X.R.

99—28 R